United States Patent [19]
Yonekawa et al.

[11] Patent Number: 5,909,781
[45] Date of Patent: Jun. 8, 1999

[54] POWER-ASSISTING DEVICE FOR A BICYCLE AND A BICYCLE EQUIPPED WITH THE SAME

[75] Inventors: Mitsuhisa Yonekawa, Kawasaki; Atsushi Takayama, Hadano, both of Japan

[73] Assignee: Kabushiki Kaisha TEC, Shizuoka, Japan

[21] Appl. No.: 08/765,614

[22] PCT Filed: Apr. 26, 1996

[86] PCT No.: PCT/JP96/01153

§ 371 Date: Dec. 24, 1996

§ 102(e) Date: Dec. 24, 1996

[87] PCT Pub. No.: WO96/33906

PCT Pub. Date: Oct. 31, 1996

[30] Foreign Application Priority Data

Apr. 28, 1995 [JP] Japan ................................ 7-106306

[51] Int. Cl.$^6$ .................................................. B62K 11/00
[52] U.S. Cl. ........................... 180/206; 180/220; 280/214
[58] Field of Search .................................. 180/205, 206, 180/207, 220, 65.2; 280/212, 215, 214

[56] References Cited

U.S. PATENT DOCUMENTS

| | | | |
|---|---|---|---|
| 4,541,500 | 9/1985 | Gelhard ..................................... | 180/205 |
| 5,361,863 | 11/1994 | Goodwin ................................. | 180/205 |
| 5,433,284 | 7/1995 | Chou ........................................ | 180/205 |
| 5,505,277 | 4/1996 | Suganuma et al. ..................... | 180/206 |
| 5,664,636 | 9/1997 | Ikuma et al. ............................ | 180/206 |

FOREIGN PATENT DOCUMENTS

| | | |
|---|---|---|
| 0 636 536 A1 | 2/1995 | European Pat. Off. . |
| 2 498 249 | 7/1982 | France . |
| 52-33850 | 8/1977 | Japan . |
| 52-37251 | 9/1977 | Japan . |
| 4-100790 | 4/1992 | Japan . |
| 4-244496 | 9/1992 | Japan . |
| 4-358986 | 12/1992 | Japan . |
| 5-58379 | 3/1993 | Japan . |
| 5-319104 | 12/1993 | Japan . |
| 6-40375 | 2/1994 | Japan . |
| 593 822 | 12/1977 | Switzerland . |

*Primary Examiner*—Lanna Mai
*Assistant Examiner*—Avraham H. Lerner
*Attorney, Agent, or Firm*—Frishauf, Holtz, Goodman, Langer & Chick

[57] ABSTRACT

A power-assisting device for use with a bicycle includes a hollow shaft which is adapted to be rotatably supported in a hanger lug of the bicycle. The hollow shaft is restricted to movement along a rotation center line thereof, and has (i) a first end portion adapted to be projected out of the hanger lug and detachably attached to a rear wheel drive gear, and (ii) a second end portion adapted to be projected out of the hanger lug and detachably attached to an input gear. A crank shaft is rotatably supported in a center hole of the hollow shaft. The crank shaft is restricted to movement along a rotation center line thereof, and has first and second end portions extending out of the hollow shaft and adapted to be detachably attached to a first and second ones of a pair of pedal-equipped crank arms. A power-assisting unit is adapted to be detachably attached to a body of the bicycle, and includes a motor and a rotation force transmission mechanism adapted to transmit a motor rotation force from the motor to the input gear. The rotation force transmission mechanism has a one-way clutch for transmitting the motor rotation force to the input gear only in a direction for driving the bicycle forward. A rotation force control unit, interposed between the crank shaft and the hollow shaft outside the hanger lug, transmits a rotation force of the crank shaft to the hollow shaft and controls the motor to generate the motor rotation force when a value of the rotation force of the crank shaft becomes larger than a predetermined value.

7 Claims, 8 Drawing Sheets

POWER-ASSISTING DEVICE FOR A BICYCLE AND A BICYCLE EQUIPPED WITH THE SAME

TECHNICAL FIELD

The present invention relates to a power-assisting device detachably mounted on a conventional bicycle and a bicycle equipped with the same.

BACKGROUND ART

A power-assisting device-equipped bicycle has been widely known which can switch a drive source between a human-power and a power-assisting device, such as an electric motor or an internal-combustion engine.

This type of power-assisting device-equipped bicycle is disclosed, for example, in Japanese Patent Application KOKOKU Publication No. 52-37251. In this Publication, a power switching mechanism of a bicycle equipped with a power-assisting device includes a hollow drive gear shaft which has one end portion fixed to a chain drive gear coupled to a rear wheel gear through a chain and which is rotatably supported in a hanger lug of the bicycle, a crank shaft which is rotatably supported in a center bore of the drive gear shaft and which has both end portions fixed to pedal crank arms, a first one-way clutch which is interposed between the crank shaft and the drive gear shaft, an input gear which is rotatably supported on the drive gear shaft and to which a rotation force is transmitted from an internal combustion engine, and a second one-way clutch which is interposed between the drive gear shaft and the input gear. Human power generated by rider is supplied to the crank shaft through pedals and the pedal crank arms and is transmitted through the first one-way clutch to the drive gear shaft and chain drive gear, and further from the chain drive gear through the chain to the rear wheel gear. A rotation force transmitted from the internal combustion engine to the input gear is transmitted through the second one-way clutch to the drive gear shaft and chain drive gear, and further from the chain drive gear through the chain to the rear wheel gear.

However, the above described power-assisting device-equipped bicycle requires a special hanger lug, which is different from the usual hanger lug of an ordinary bicycle, for mounting the power switching mechanism structured as described above, and it is necessary that bicycle using such power-assisting devices specifically designed. As a result, the price of the conventional power-assisting device-equipped bicycles is high.

In recent years, a power-assisting device-equipped bicycle has been known that usually uses human power as a drive source and, when the rider requires an additional drive force greater than a predetermined force, uses a power-assisting device such as a motor or an internal combustion engine, in addition to the human power.

This type of power-assisting device-equipped bicycle is disclosed in, for example, Japanese Patent Application KOKOKU Publication No. 52-33850. A power switching mechanism of this power-assisting device-equipped bicycle includes a hollow drive shaft which has an input gear receiving a rotation force transmitted from an internal combustion engine and which is rotatably supported in a hanger lug of the bicycle, a crank shaft which is rotatably supported in an inner bore of the drive shaft and which has both end portions fixed to pedal crank arms, and a chain drive gear connected through a chain to a rear wheel gear. Human power generated by a rider is supplied to the crank shaft through pedals and the pedal crank arms and is transmitted through the chain drive gear and the chain to the rear wheel gear. Further, when the human power, that is, a drive power, loaded by a rider to the crank shaft becomes a value greater than a predetermined value, an additional rotation force from the internal combustion engine is loaded through the hollow drive shaft to the chain drive gear, in addition to the human power, and is transmitted, together with the human power, through the chain to the rear wheel gear.

This power-assisting device-equipped bicycle also requires a special hanger lug, which in is different from that of the ordinary bicycle, for mounting the power switching mechanism structured as described above, and it is therefore again necessary to provide a specifically designed bicycle. Such a specific design makes the price of this conventional power-assisting device-equipped bicycle high.

In this bicycle equipped with the power-assisting device, moreover, the chain drive gear has a specifically designed structure, which is different from the usual structure of the conventional bicycle, for loading a rotation force from the internal combustion engine to the crank shaft, in addition to the human power, when the human power, that is, a drive force, loaded to the crank shaft becomes a value greater than a predetermined value. The chain drive gear of such a specific structures further increased the price of this conventional power-assisting device-equipped bicycle.

As a rotation drive force transmission device for transmitting a rotation drive force from the power-assisting device to a front wheel or a rear wheel of the bicycle in the conventional power-assisting device-equipped bicycle, a structure is used whereby an output shaft of the power-assisted device is frictionally in contact with the front wheel or the rear wheel of the bicycle. However, the rotation drive force transmission device using the frictional contact is lower in a transmission efficiency of the rotation drive force.

This invention is derived from the above described circumstances, and an object of this invention is to provide a power-assisting device for a bicycle, which can use a body or almost all of the component parts of a conventional bicycle to make the price of the power assisted bicycle low and which can effectively transmit a rotation drive force from the power-assisting device to the wheel of the bicycle, and a bicycle equipped with the above described power-assisting device.

DISCLOSURE OF INVENTION

In order to achieve the object of this invention, a power-assisting device for a bicycle comprises:

a hollow shaft which is rotatably supported in a hanger lug of a bicycle, is restricted a movement thereof along a rotation center line thereof, and has both end portions projected out of the hanger lug, one end portion of which being detachably attached to a rear wheel drive gear and another end portion of which being detachably attached to an input gear;

a crank shaft which is rotatably supported in a center hole of the hollow shaft, is restricted a movement thereof along a rotation center line thereof and has both end portions extending out of the hollow shaft, the both end portions being detachably attached to a pair of pedal-equipped crank arms;

a power-assisting unit which is detachably attached to a body of the bicycle, and has a motor and a rotation force transmission mechanism for transmitting a rotation force from the motor to the input gear, the rotation force transmission mechanism having a one-way clutch for transmitting the rotation force from the motor to the input gear only in the direction in which the bicycle moves forward; and a rotation force control unit which is interposed between the crank shaft and the hollow shaft at an out side of the hanger lug, transmits a rotation force of the crank shaft to the hollow shaft, and controls the motor to generate a rotation force when a value of the rotation force of the crank shaft becomes larger than a predetermined value.

In the power-assisting device for a bicycle, according to the invention and structured as described above, the hollow shaft and the crank shaft are coaxially supported in the hanger lug of the bicycle to be rotatable. Further, the power-assisting unit is detachably attached on the body of the bicycle and the rotation force control unit is interposed between the crank shaft and the hollow shaft at an outside of the hanger lug.

Consequently, the power-assisting device for a bicycle can be manufactured and put on a market, independently of the body of the bicycle. Further since the body of the conventional bicycle can be used, the bicycle using the power-assisting device can be provided at a much lower cost than the above-mentioned conventional power-assisting device-equipped bicycle.

Since the rotation force transmission mechanism and the input gear equipped with the one-way clutch on the hollow shaft are used to transmit a rotation force from the motor to the rear wheel drive gear, the rotation force from the motor serving as a power-assisting device can be effectively transmitted to the wheel of the bicycle.

In the power-assisting device for a bicycle according to the invention and structured as described above, it is preferable that the power-assisting unit having the motor, the input gear on the other end portion of the hollow shaft, the rotation force control unit and one end portion of the crank shaft projecting out of the other end portion of the hollow shaft and excluding the pedal-equipped crank arm corresponding thereto are preferably housed in one casing.

In this structure, when the power-assisting device for a bicycle according to this invention is put on a market, it is treated as a single assembled unit around the above described one casing, so that a transporting cost thereof can be lowered.

Where one-casing is used as described above and the rotation force transmission mechanism of the power-assisting unit includes various rotation members each having a rotation center shaft, it is preferable that shaft supporting structures are formed in the above described one casing at positions corresponding to both end portion of each of the rotation center shafts of the various rotation members so that each shaft supporting structure rotatably supports the both ends of the rotation center shaft corresponding to each shaft supporting structure.

In this structure, a structure of a rotation supporting mechanism for each of the various rotation members in the rotation force transmission mechanism can be simple, and a manufacturing cost of the power-assisting device for a bicycle according to this invention can be lowered.

In the power-assisting device for a bicycle according to this invention and characterized by being structured as described above, the rotation force control unit preferably includes:

one set in a plurality of projections and plurality of grooves, which is formed in a radial array on one side surface of the input gear of the hollow shaft;

a selective engaging member which is arranged to face the above one side surface of the input gear of the hollow shaft, is connected to the crank shaft through the one-way clutch coupled to the crank shaft and being capable of transmitting human power from the crank shaft only in the direction in which the bicycle moves forward, and is movable in a predetermined range in a direction along a center line of the crank shaft, and on a side surface of which, feeing the above described one side surface of the input gear, the other set in the plurality of projections and plurality of grooves is formed;

an urging/restricted rotation allowable mechanism which is interposed between the input gear and the selective engaging member, and which urges the selective engaging member, with a predetermined force, toward the input gear to engage the other set in the plurality of projections and plurality of grooves on the selective engaging member with the above described one set in the plurality of projections and plurality of grooves on the above described one side surface of the input gear and to allow a rotation of the selective engaging member relative to the input gear in a predetermined range; and a power supply switch which allows a connection between the motor and the power supply by a separation of the selective engaging member from the above described one side surface of the input gear over a predetermined range in a direction along the center line of the crank shaft.

Such a rotation force control unit is simple in structure and has a few failure. When a rotation force of the crank shaft (that is, the human power input to the crank shaft) reaches over a predetermined value, the engagement of the other set in the plurality of projections and plurality of grooves of the selective engaging member with the above described one set in the plurality of projections and grooves on the above described one side surface of the input gear of the hollow shaft is released against the urging force of the urging/restricts rotation allowable mechanism to allow a rotation of the selective engaging member relative to the input gear in a predetermined range. As a result, the selective engaging member is separated from the above describe one side surface of the input gear in a predetermined range in the direction along the center line of the crank shaft, so that the power supply switch is turned on. Consequently, not only a human power of a given value but also the additional rotation force of the motor is loaded through the rotation force transmission mechanism of the power-assisting unit to the input gear of the hollow shaft, and further to the rear wheel drive gear of the hollow shaft.

In order to rotatably support the hollow shaft in the hanger lug of the bicycle and restricts a movement of the hollow shaft along the rotation center line thereof, the power-assisting device for a bicycle according to the present invention and characterized by being structured as described above can use well known bearing holding members which are threadably engaged in both end openings of the center hole of the hanger lug of the bicycle, and each of which has a center hole into which the hollow shaft in inserted, and hold a bearing around the center hole to rotatably support the hollow shaft.

A bicycle equipped with the power-assisting device for a bicycle according to this invention and characterized by being structured as described above, comprises:

a body including a seat and a hanger lug having a center hole through which a crank shaft is rotatably inserted;

a rear wheel rotatably supported on the body at a opposition located behind the seat;

a handle provided on the body at a position located in front of the seat;

a front wheel rotatably supported on the handle;

a hollow shaft which is rotatably supported in the hanger lug, is restricted a movement thereof along a rotation center line thereof, and has both end portions projected out of the hanger lug, one end portion of which being detachably attached to a rear wheel drive gear and another end of which being detachably attached to an input gear;

a crank shaft which is rotatably supported in a center hole of the hollow shaft, is restricted a movement thereof along a rotation center line thereof, and has both end portions extending out of the hollow shaft, the both end portions being detachably attached to a pair of pedal-equipped crank arms;

a power-assisting unit which is detachably attached to the body, and has a motor and a rotation power transmission mechanism for transmitting a rotation force from the motor to the input gear, the rotation force transmission mechanism having a one-way clutch for transmitting the rotation force from the motor to the input gear only in a direction in which the bicycle moves forward;

a rotation force control unit which is interposed between the crank shaft and the hollow shaft at an outside of the hanger lug, transmits a rotation force of the crank shaft to the hollow shaft, and controls the motor to generate a rotation force when a value of the rotation force of the crank shaft becomes larger than a predetermined value; and a rear wheel drive rotation force transmission mechanism for transmitting the rotation force from the rear wheel drive gear of the hollow shaft to the rear wheel.

The power-assisting device-equipped bicycle structured as described above can use the body, rear wheel, handle, front wheel, rear wheel drive gear and rear wheel drive rotation force transmission mechanism of the conventional bicycle.

In order to rotatably support the hollow shaft in the hanger lug of the bicycle and restrict a movement of the hollow shaft along the rotation center line thereof, the power-assisting device-equipped bicycle structured as described above can use well known bearing holding members which are threadably engaged in both end openings of the center hole of the hanger lug of the bicycle, and each of which has a center hole into which the hollow shaft is inserted, and holds a bearing to rotatably support the hollow shaft.

BEST MODE FOR CARRYING OUT THE INVENTION

A power-assisting device for a bicycle according to an embodiment of the present invention, and a power-assisting device-equipped bicycle which uses the power-assisting device will be explained below with reference to the accompanying drawings.

Figure 1:
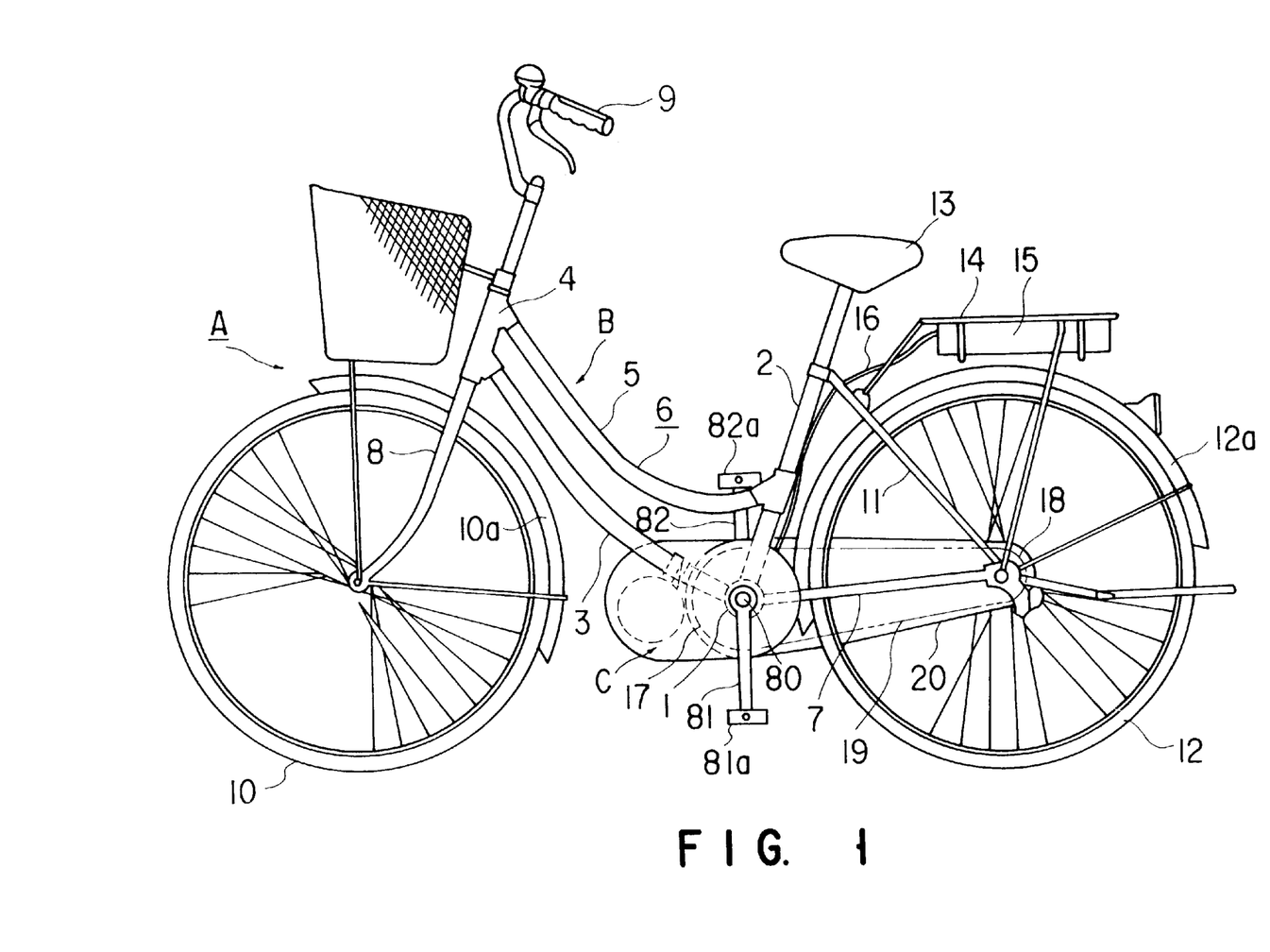
FIG. 1 is a side view showing a power-assisting device-equipped bicycle using a power-assisting device for a bicycle according to one embodiment of the present invention.

FIG. 1 shows a side view of the power-assisting device for a bicycle according to the embodiment of the present invention, and the power-assisting device-equipped bicycle which uses the power-assisting device.

In FIG. 1 reference symbol A indicates the power-assisting device-equipped bicycle according to the embodiment of this invention, reference symbol B indicates a bicycle which is used in the power-assisting device-equipped bicycle A according to the embodiment of this invention, and reference symbol C indicates a power-assisting device which is according to the embodiment of this invention. The power-assisting device is detachably attached on the bicycle B and, together with the bicycle B, constitutes the power-assisting device-equipped bicycle A according to the embodiment of this invention.

The bicycle B includes a frame 6 having a hanger lug 1, a seat tube 2, a down tube 3, a head tube 4, a top tube 5, a pair of chain stays 7, and a pair of seat stays 11. The hanger lug 1 has a center hole in which a crank shaft 80 is rotatably inserted, and a pair of crank arms 80 equipped with a pair of pedals 81a, 82a are fixed to both end sides portions of the crank shaft 80. The seat tube 2 is fixed to the hanger lug 1 and extends substantially upwardly from the hanger lug 1. The down tube 3 is fixed to the hanger lug 1, and extends from the hanger lug 1 in an upwardly forward direction. The head tube 4 is fixed to an extending end of the down tube 3 and extends in a substantially vertical direction. The top tube 5 located above the down tube 3, extends along the down tube 3 and is fixed at its both ends to the corresponding head tube 4 and seat tube 2. The pair of chain stays 7 are fixed at their base ends to the hanger lug 1 so that their base ends are horizontally spaced apart from each other with the hanger lug 1 being interposed therebetween, and rearwardly extends from the hanger lug 1. The pair of seat stays 11 extend between the upper end of the seat tube 2 and the rearwardly extending ends of the paired chain stays 7 and are fixed at their both ends to the upper end of the seat tube 2 and the rearwardly extending ends of the paired chain stays 7.

A saddle 13 is attached on the upper end of the seat tube 2 of the frame 6 and a fork 8 is supported by the head tube 4 to be rotatable around a center line of the head tube 4. A front wheel 10 is rotatably supported by lower ends of bi-forked lower extending portions of the front fork 8, and a front fender 10a is fixed to the bi-forked lower extending portions of the front fork 8 to cover substantially the two-thirds of a rear half of the front wheel 10. Further, a handle 9 is fixed to an upper end of the front fork 8 projected upward from the seat tube 2.

A rear wheel 12 is rotatably supported by the rearwardly extending ends of the paired chain stays 7. A rear fender 12a is fixed to the paired chain stays 7 and paired seat stays 11 to cover a substantially upper half of the rear wheel 12. A rack 14 is further fixed to the paired chain stays 7 and paired seat stays 11 at a position located above the rear fender 12a.

A free wheel gear 18 is fixed to the rear wheel 12 through a one-way clutch. A chain 19 is hung on the free wheel 18 and a rear wheel drive gear (chain wheel in this embodiment) 17 concentrically or operatively connected to the crank shaft 80. In this embodiment, the chain 19 and free wheel gear 18 constitute a rear wheel drive rotation force transmission mechanism for transmitting a rotation force from the rear wheel drive gear 17 to the rear wheel 12. However, the rear wheel drive rotation force transmission mechanism may be structured by a propeller shaft for transmitting a rotation force from the rear wheel drive gear 17 to the rear wheel 12 or by a rubber belt in place of the chain 19. The free wheel gear 18, chain 19 and rear wheel drive gear 17 are encased in a chain casing 20 supported by the chain stay 7 located on the same side as these structural elements.

Except for the crank shaft 80 and operative coupling mechanism for operatively coupling the crank shaft 80 to the rear wheel drive gear 17, the above-mentioned bicycle B has the same structure as that of a conventional bicycle available on the market.

The operative coupling mechanism for operatively coupling the crank shaft 80 to the rear wheel drive gear 17 will be explained below in more detail.

The power-assisting device C is located on a side of the bicycle B opposite to the rear wheel drive gear 17, and is detachably attached to the frame 6 through the down tube 3 of the frame 6 and crank shaft 80.

In this embodiment, a power-assisting source of the power-assisting device C for a bicycle is an electric motor, and a battery 15 for the motor is detachably fixed to the rack 14 of the bicycle B. An electric current is supplied from the battery 15 to the motor 16 through a lead wire 16.

The structure of the power-assisting device C for a bicycle will be explained below in more detail with reference to FIGS. 2 to 7.

Figure 2:
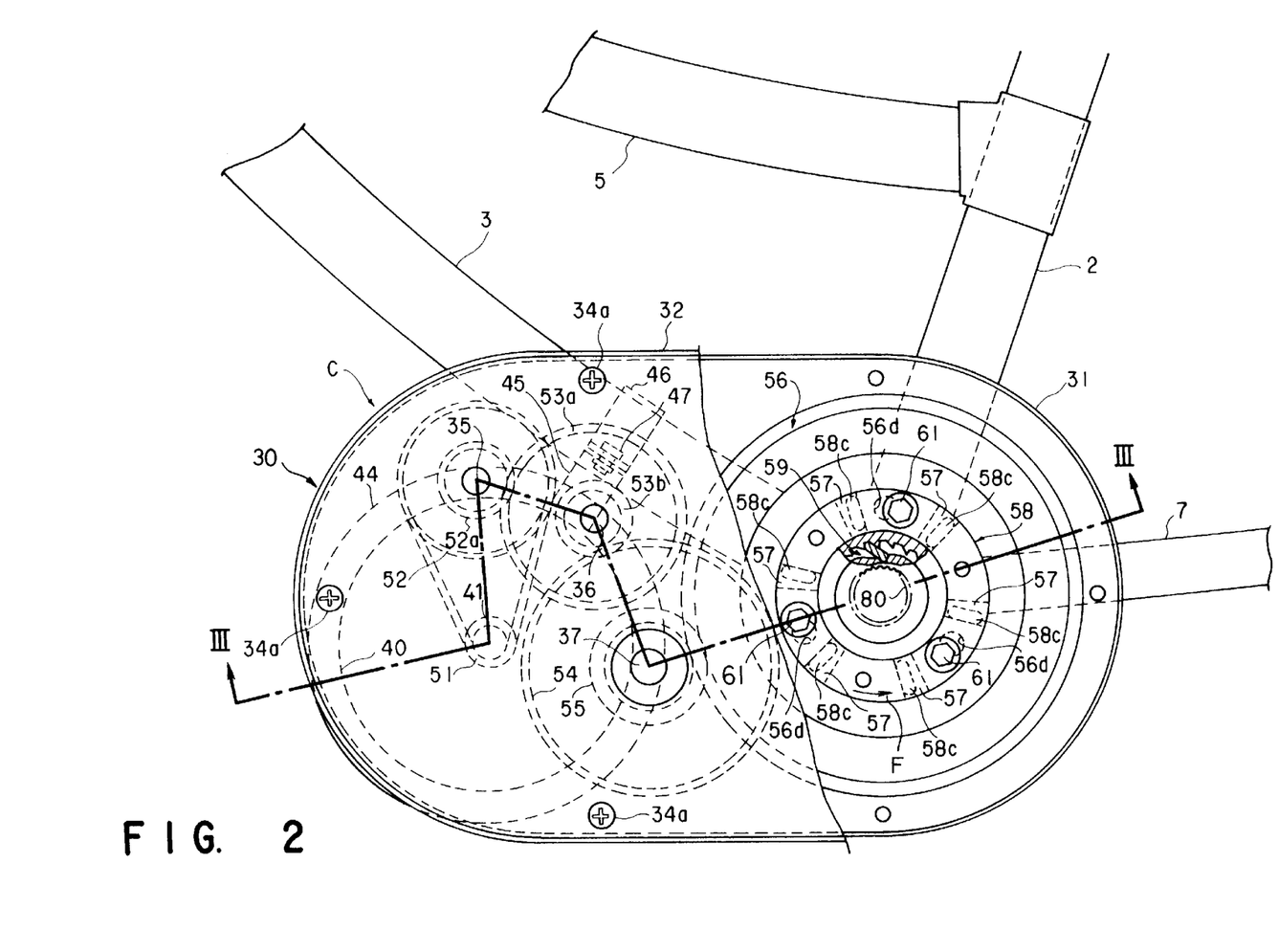
FIG. 2 is an enlarged side view showing the power-assisting device of FIG. 1 with a part of which being taken away.
Figure 3:
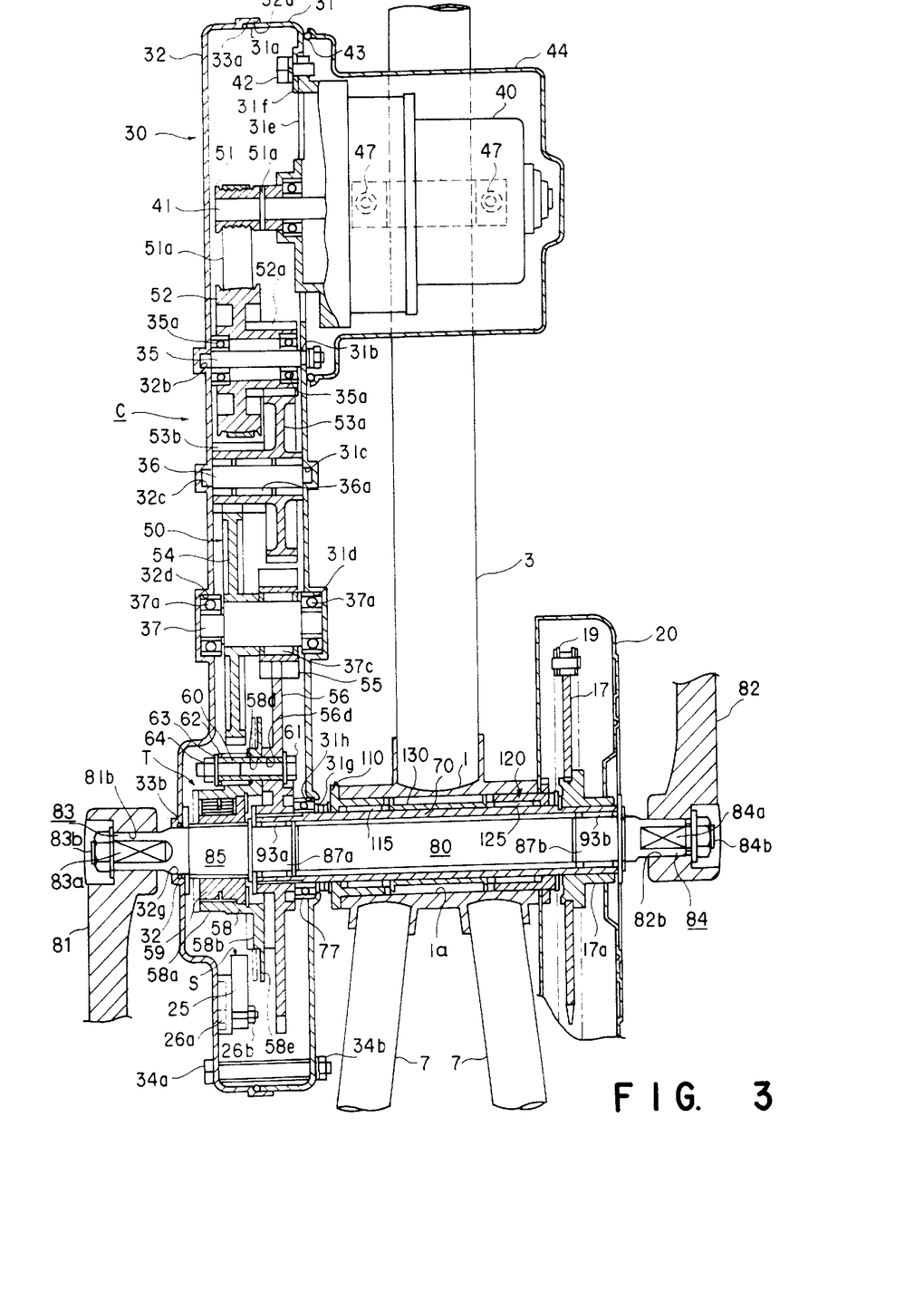
FIG. 3 is a cross-sectional view taken along a line III—III in FIG. 2.
Figure 7:
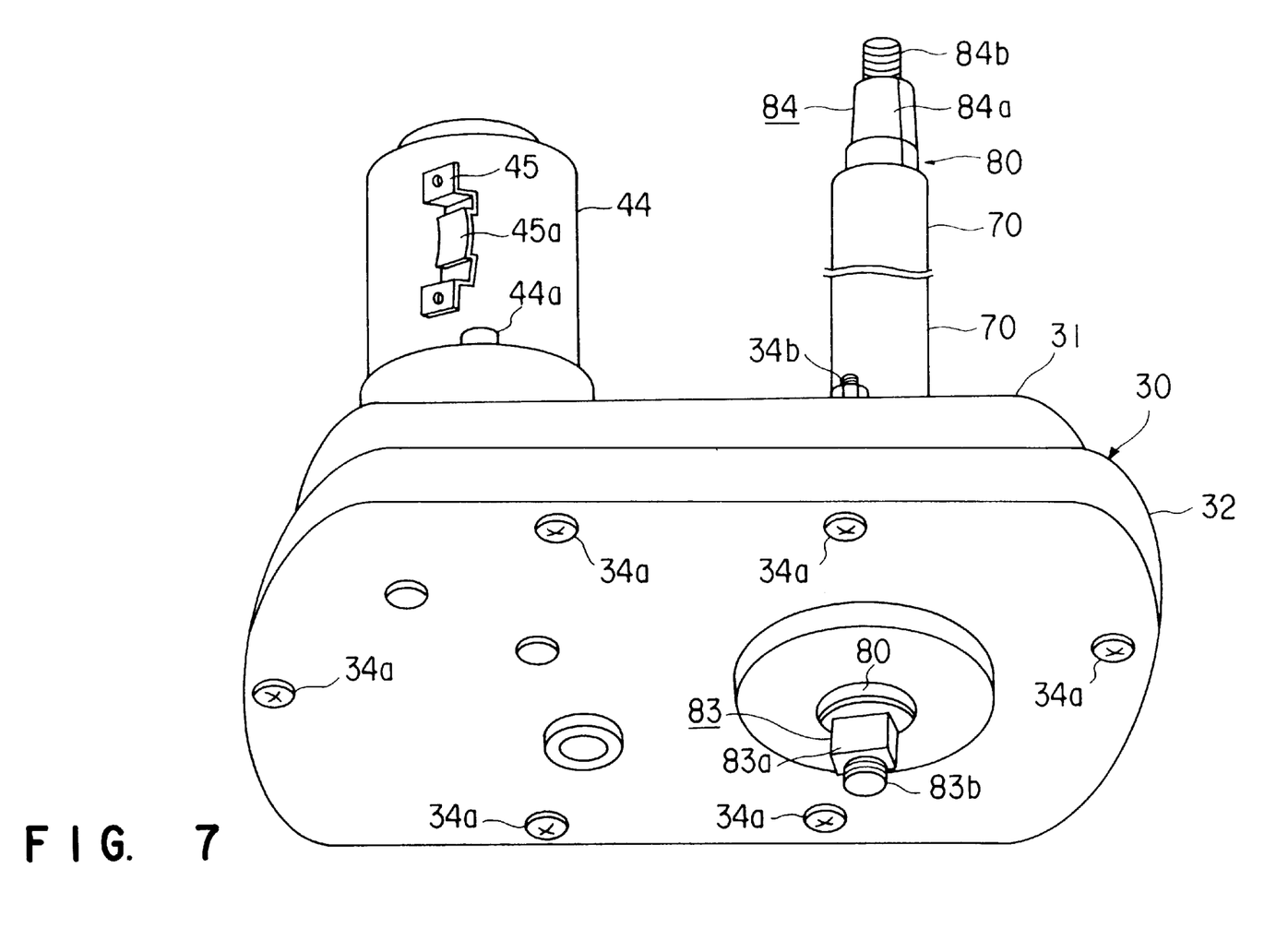
FIG. 7 is a perspective view showing the power-assisting device according to one embodiment of this invention in a state that it is separated from a conventional bicycle to which the power-assisting device is to be attached, and it is put on a market.

As shown in FIGS. 2, 3 and 7 in more detail, almost all of a structure of the power-assisting device C for a bicycle is encased in a power-assisting device casing 30. The casing 30 has a flat oblong shape with both semi-circular ends, and has a flat oblong pan-like inner casing member 31 and a flat oblong pan-like outer casing member 32. The inner casing member 31 is extended forwardly from the hanger lug 1 of the frame 6 of the bicycle B along the down tube 3, and is opened on a side opposite to the down tube 3. The outer casing member 32 opened to face the opening of the inner casing member 31. An open end of the outer casing member 32 is formed to serve as a fitting recess 32a in which an open end 31a of the inner casing member 32 is fitted. The open end 31a of the inner casing 31 is liquid-tightly fitted in the fitting recess 32a of the open end of the outer casing member 32 with a sealing member 33a being sandwiched therebetween. The inner casing member 31 and outer casing member 32 are mutually coupled together by a combination of a plurality of screws 34 penetrating peripheries of the outer and inner casing members 32 and 31 and plurality of nuts 34b threaded on the ends of these screws 34. Each of the inner casing 31 and outer casing 32 is formed by a metal plate, such as an iron plate, so as to enhance its cooling effect and lower its price. In a side wall of the inner casing member 31, an insertion hole 31e is formed at a position located far away from the hanger lug 1 to allow an insertion of an output shaft 41 of the motor 40 thereinto. A motor mounting portion 31f is formed on a peripheral edge portion of the insertion hole 31e to allow the motor 40 to be detachably fixed thereto by a known fixing means such as screws 42. The motor 40 projecting outward from the side wall of the inner casing member 31 is covered by a cover 44. The cover 44 is detachably fixed by a known fixing means, such as screws 44a (see FIG. 7) to the side wall of the inner casing member 31 with a sealing member 43 being interposed therebetween.

A fitting base 45 is fixed to the cover 44. The fitting base 45 has a fitting portion 45a with a semi-circular cross-section, and the fitting portion 45a is fitted from a position under the down tube 3 on the down tube 3 of the frame 6 of the bicycle B. While the fitting portion 45a is fitted from a position under the down tube 3 on the down tube 3 of the frame 6 in the bicycle B, the fitting base 45 is detachably connected to a fitting plate 46 (see FIG. 2) which is fitted from a position over the down tube 3 on the down tube 3, by a well known fixing means such as screws 47 (see FIGS. 2 and 3), so that the fitting base 45 is detachably connected to the down tube 3.

On a projecting end portion of the output shaft 41 of the motor 40 projecting into the casing 30, an output pulley 51 having a small-diameter is attached as shown in FIG. 3 with a pin 51a not to be rotated relative to the output shaft 41. As shown in FIGS. 2 and 3, an input pulley 52 having a large-diameter is arranged above the output pulley 51 on the output shaft 41 of the motor 40 in the casing 30, and a power transmission belt 51a is hung on the output pulley 51 on the output shaft 41 of the motor 40 and on the input pulley 52.

On a side surface of the input pulley 52, which faces the motor 40, a small-diameter power transmission input gear 52a is formed to be coaxial with the input pulley 52. An integral unit of the input pulley 52 and power transmission input gear 52a is rotatably supported by bearings 35a on a rotation center shaft 35, one end of which being supported by a shaft support structure, such as a shaft support hole 31b, formed in the side wall of the inner casing member 31 of the casing 30 and the other end of which being supported by a shaft support structure, such as a shaft support recess 32b, formed in the side wall of the outer casing member 32 to correspond to the shaft support hole 31a in the inner casing member 31.

A large-diameter power transmission intermediate gear 53a is located behind the power transmission input gear 52a in the casing 30 and engages with the power transmission input gear 52a of the input pulley 52. At a side surface of the power transmission intermediate gear 53a on the input pulley side, a small-diameter power transmission intermediate gear 53b is formed concentric with the large-diameter power transmission intermediate gear 53a. An integral unit of the large-diameter power transmission intermediate gear 53a and small-diameter power transmission intermediate gear 53b is rotatably supported by bearings 36a on a rotation center shaft 36, one end of which being supported by a shaft support structure, such as a shaft support recess 31c, formed in the side wall of the inner casing member 31 of the casing 30 and the other end of which being supported by a shaft support structure, such as a shaft support recess 32c, formed in the side wall of the outer casing member 32 to correspond to the shaft support recess 31c of the inner casing member 31.

A large-diameter power transmission pre-output gear 54 is located below the small-diameter power transmission intermediate gear 53b in the casing 30 and engages with the small-diameter power transmission intermediate gear 53b. The large-diameter power transmission pre-output gear 54 is fixed to a rotation center shaft 37, one end of which being rotatably supported via a bearing 37a by a shaft support structure, such as a shaft support recess 31d, formed in the side wall of the inner casing member 31 of the casing 30 and the other end of which being rotatably supported via another bearing 37a by a shaft support structure, such as a shaft support recess 32d, formed in the side wall of the outer casing member 32 to correspond to the shaft support recess 31b of the inner casing member 31. A power transmission final-output gear 55 is supported by a one-way clutch 37c on the rotation center shaft 37 at a side of the power transmission pre-output gear 54 which is located near to the side wall of the inner casing 31.

In this embodiment, a rotation force transmission mechanism 50 is constituted by the above-mentioned various power transmission members from the output pulley 51 fixed to the output shaft 41 of the motor 40 to the power transmission final-output gear 55, that is, the power transmission belt 51a, the integral unit of the input pulley 52 and power transmission input gear 52a, the integral unit of the large-diameter power transmission intermediate gear 53a and small-diameter power transmission intermediate gear 53b, and a combination of the large-diameter power transmission pre-output gear 54, rotation center shaft 37, one-way clutches 37c and power transmission final-output gear 55. Further, the rotation force transmission mechanism 50, casing 30 and motor 40 integrated with the rotation force transmission mechanism 50 through the casing 30 constitute the power-assisting unit.

Figure 4:
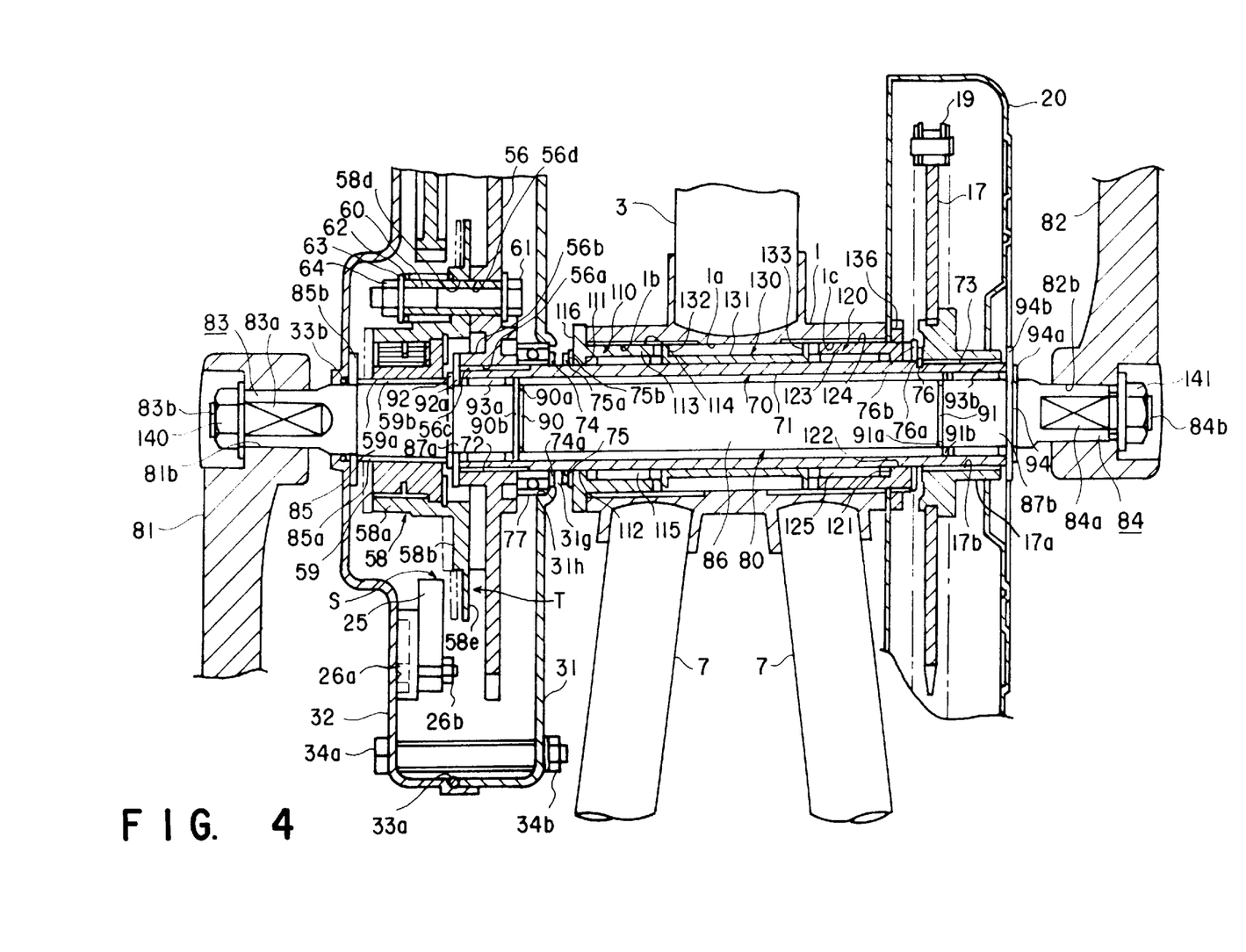
FIG. 4 is an enlarged cross-sectional view showing an arrangement near around a hanger lug in FIG. 3.

As shown in FIGS. 3 and 4, a large-diameter shaft through hole 31g is formed in the inner casing member 31 of the casing 30 to face a center hole 1a of the hanger lug 1, and a small-diameter shaft through hole 32g is formed in the outer casing member 32 to correspond to the shaft through hole 31g of the inner casing member 31.

A hollow shaft 70 is inserted through the center hole 1a of the hanger lug 1, and a crank shaft 80 is inserted into a center hole 71 (see FIG. 4) of the hollow shaft 70. Both ends of each of the hollow shaft 70 and crank shaft 80 are projected from both ends of the center hole 1a of the hanger lug 1, and the both ends of the crank shaft 80 are further projected from the both ends of the hollow shaft 70.

The ends of the hollow shaft 70 and crank shaft 80 located near to the casing 30 are inserted into the large-diameter shaft through hole 31g of the inner casing member 31. The end of the crank shaft 80 located near to the casing 30 is further projected to an outside space via the small-diameter shaft through hole 32g of the outer casing member 32. A periphery of the large-diameter shaft through hole 31g of the inner casing member 31 is structured as a bearing mounting recess 31h. The end portion of the hollow shaft 70 located near to the casing 30 is rotatably supported by a bearing 77 mounted in the bearing mounting recess 31h of the inner casing member 31. A packing 33b is mounted in the small-diameter shaft through hole 32g of the outer casing member 32, and rotatably supports the end portion of the crank shaft 80 located near to the casing 30 relative to the outer casing member 32 in a water-tight fashion.

An annular groove 74 is formed in the outer peripheral surface of the hollow shaft 70 at a position located adjacent to the bearing 77 and outside of the casing 30. An annular latching member 74a (see FIG. 4) is fitted in the annular groove 74, and positions the hollow shaft 70 relative to the bearing 77, that is, the casing 30, in a direction along the rotation center line of the hollow shaft 70.

The end portion of the crank shaft 80 located near to the casing 30 is inserted into the large-diameter shaft through hole 31g of the inner casing member 31 and is projected to an outside space through the small-diameter shaft through hole 32g of the outer casing member 32.

The other ends of the hollow shaft 70 and crank shaft 80 located away from the casing 30 are inserted into a shaft through hole formed in an inner side wall of the chain casing 20 at a position corresponding to the hanger lug 1, and the other end of the crank shaft 80 is further projected to an outside space through another shaft through hole formed in an outer side wall of the chain casing 20.

The crank shaft 80 inserted in the center hole 71 (see FIG. 4) of the hollow shaft 70 is rotatably supported at its bearing support portions 87a, 87b corresponding to the both ends of the center hole 71, by bearings 93a and 93b provided at the both ends of the center hole 71.

As particularly shown in FIG. 4, two annular grooves 90 and 91 are formed in the outer peripheral surface of the crank shaft 80 at a boundary between one bearing support portion 87a and a middle portion 86 between the two bearing support portions 87a and 87b, and at a boundary between the other bearing support portion 87b and the middle portion 86. Annular engaging members 90a and 91a are fitted in the corresponding annular grooves 90 and 91. At the outer peripheral surface of the crank shaft 80, washers 90b and 91b are placed at outsides of the engaging members 90a and 91a. The bearings 93a and 93b on the both ends of the center hole 71 of the hollow shaft 70 are prevented from moving inward from the two bearing support portions 87a and 87b by the washers 90b and 91b and engaging members 90a and 91a at the inner ends of the two bearing support portions 87a and 87b on the outer peripheral surface of the crank shaft 80.

As particularly better shown in FIGS. 3 and 4, a portion of the outer peripheral surface of the crank shaft 80, located outside of the bearing support portion 87a at the casing side, is formed as a stepped portion 85 having a somewhat greater diameter than that of the bearing support portion 87a. As particularly shown in FIG. 4, a washer 92a, together with a spacer 92, is seated on a step between the stepped portion 85 and the bearing support portion 87a. The washer 92a prevents the casing-side end of the hollow shaft 70 and bearing 93a on the casing-side bearing support portion 87a from moving on the crank shaft 80 toward the inside of the casing 30, and prevents the crank shaft 80 from moving, relative to the center hole 71 of the hollow shaft 70, toward the chain casing 20 and finally from dropping out of the center hole 71 of the hollow shaft 70.

In the outer peripheral surface of the chain-casing-side end of the crank shaft 80 projecting from the end of the hollow shaft 70, an annular groove 94 is formed at a position located adjacent to the chain-casing-side end of the hollow shaft 70, and an annular engaging member 94a is fitted in the groove 94. Further, on the outer peripheral surface of the chain-casing-side end of the crank shaft 80, a washer 94b is provided to be adjacent to the engaging member 94a on the outside thereof. The washer 94b prevents the chain-casing-side end of the hollow shaft 70, as well as the bearing 93b on the chain-casing-side bearing support portion 87b, from moving toward the outside of the chain casing 20, that is, in a direction away from the hanger lug 1 in the chain casing 20, and also prevents the crank shaft 80 from moving, relative to the center hole 71 of the hollow shaft 70, toward the casing 30 and from falling off the center hole 71 of the hollow shaft 70.

On the outer peripheral surfaces of the both end portions of the crank shaft 80 projecting from the bearings 93a and 93b at the both ends of the hollow shaft 70, a combination of the spacer 92 and washer 92a and a combination of the engaging member 94a and washer 94b, respectively located at positions being adjacent to the bearings 93a and 93b at the both ends of the hollow shaft 70, prevent a fall of the bearings 93a, 93b at the both ends of the hollow shaft 70, as well as a fall of the crank shaft 80, off the center hole 71 of the hollow shaft 70.

As particularly shown in FIG. 4, the hollow shaft 70 passing through the center hole 1a of the hanger lug 1 is rotatably supported by bearings 115, 125 relative to the center hole 1a of the hanger lug 1, these bearings 115 and 125 being held by substantially cylindrical bearing holding members 110 and 120 whose outer peripheral surfaces, that is, externally threaded portions 114 and 124, are threadably inserted from an outside into internally threaded portions 1b and 1c formed in the both end portions of the center hole 1a of the hanger lug 1.

The bearing holding members 110 and 120 have cylindrical bodies 113 and 123 holding the bearings 115 and 125 in their inner peripheries and flanges 116 and 136 on the outer ends of the cylindrical bodies 113 and 123. The flange 116 of the casing-side bearing holding member 110 is in contact with the casing-side end surface of the hanger lug 1. The flange 136 of the chain-casing-side bearing holding member 120 on the opposite side away from the casing 30 holds the periphery of the small-sized shaft through hole in the inside wall of the chain casing 20, in cooperation with the end surface of the hanger lug 1 on the opposite side away from the casing 30 to fix the hanger lug-side side wall or inner side wall of the chain casing 20 to the hanger lug 1.

The radially inner ends of the flanges 116 and 136 of the paired bearing holding members 110 and 120 provide inward projections 111 and 121 having somewhat larger inner peripheral surfaces 112 and 122 than the diameter of the outer peripheral surface of the hollow shaft 70, so that the bearings 115 and 125 held by the inner peripheral surfaces of the cylindrical bodies 113 and 123 of the bearing holding members 110 and 120 are prevented from falling off the inner peripheral surfaces of the cylindrical bodies 113 and 123.

A cylindrical bearing position restricting member 130 is provided in the center hole 1a of the hanger lug 1 such that it is mounted on the outer peripheral surface of the hollow shaft 70 at an area between the bearing holding members 110 and 120 located at the both ends of the center hole 1a. Both ends of a cylindrical body 131 of the bearing position restricting member 130 are located adjacent to the inner ends of the bearing holding members 110 and 120, and annular end plates 132 and 133 are formed at the both ends of the body 131 to prevent the bearings 115 and 125 held by the inner peripheral surfaces of the cylindrical bodies 113 and 123 of the bearing holding members 110 and 120 from falling off the inner peripheral surfaces of the cylindrical bodies 113 and 123.

Annular grooves 75 and 76 are formed in the outer peripheral surface of the hollow shaft 70 at positions adjacent to the outside of the flanges 116 and 136 of the paired bearing holding members 110 and 120 at the both ends of the center hole 1a of the hanger lug 1. Annular engaging members 75a and 76a are engaged with the annular grooves 75 and 76. Washers 75b and 76b are placed on the outer peripheral surface of the hollow shaft 70 at positions located adjacent to the hangerlug-side ends of the engaging members 75a and 76a. When an external force is loaded to the hollow shaft 70 in a direction along the center line of the center hole 1a of the hanger lug 1, the washers 75b and 76b are pressed by the engaging members 75a and 76a on the outer peripheral surface of the hollow shaft 70, and are pressed against the outside surfaces of the flanges 116 and 136 of the paired bearing holding members 110 and 120 at the both ends of the center hole 1a of the hanger lug 1. By doing so, the hollow shaft 70 is prevented from falling off the center hole 1a of the hanger lug 1.

As particularly shown in FIG. 4, a male spline 73 is formed in the outer peripheral surface of the end portion of the hollow shaft 70 located within the chain casing 20, and is engaged with a female spline 17b formed in an inner peripheral surface of a cylindrical coupling member 17a coaxially fixed to the rear wheel drive gear 17. By this engagement, the rear wheel drive gear 17 can be attached and detached to the end portion of the hollow shaft 70 in a direction along the center line of the hollow shaft 70, and can be rotated with the hollow shaft 70.

A fall of the coupling member 17a of the rear wheel drive gear 17 from the chain-casing-side end of the hollow shaft 70 is prevented by a combination of the engaging member 94a and washer 94b on the outer peripheral surface of the chain-casing-side end portion of the crank shaft 80.

As shown in FIGS. 3 and 4, the both end portions of the hollow shaft 70 outwardly projecting from the casing 30 and chain casing 20 are structured as crank arm engaging portions 83 and 84 having predetermined shaped engaging surfaces 83a and 84a. Predetermined shaped crank shaft engaging holes 81b and 82b at base end portions of the well known crank arms 81 and 82 are engaged with the crank arm engaging portions 83 and 84. The well known crank arms 81 and 82, the predetermined shaped crank shaft engaging holes 81b and 82b at their base end portions being engaged with the predetermined shaped crank arm engaging portions 83 and 84 at the both end portions of the hollow shaft 70, are detachably fixed to the crank arm engaging portions 83 and 84 by screwing nuts 140 and 141 on male screws 83b and 84b formed at projecting ends of the crank arm engaging portions 83 and 84.

In the outer peripheral surface of the end portion of the hollow shaft 70 within the casing 30, a male spline 72 is formed between the end surface of the above-mentioned end portion (that is, the combination of the spacer 92 and washer 92a at the end portion of the crank shaft 80 adjacent to the above-mentioned end surface) and the bearing 77 of the inner casing member 31 corresponding to the above-mentioned end portion. A female spline 56c is provided in an inner peripheral surface of a center hole 56a of a cylindrical center portion 56b of an input gear 56, and engages with the male spline 72. Within the casing 30, the input gear 56 engages with the power transmission final-output gear 55 located nearest to the hollow shaft 70 and crank shaft 80 in the rotation force transmission mechanism 50 arranged in front of the hollow shaft 70 and crank shaft 80.

Around the outer peripheral surface of the stepped portion 85 of the crank shaft 80 located adjacent to the end of the hollow shaft 70 in the casing 30, a rotation force control unit T is located to transmit a rotation force of the crank shaft 80 to the hollow shaft 70 and to make the motor 40 generate a rotation force when the rotational force of the crank shaft 80 exceeds a predetermined value.

The structure of the rotation force control unit T will be explained below. A male spline 85a is formed on the outer peripheral surface of the stepped portion 85 of the crank shaft 80. A female spline 59b is formed in an inner peripheral surface of the center hole 59a of a one-way clutch 59, and engages with the male spline 85a. By this engagement, the one-way clutch 59 is detachable through the casing-side end of the crank shaft 80 relative to the stepped portion 85 of the crank shaft 80 in a direction along the center line of the crank shaft 80, and is also rotatable with the crank shaft 80.

On the outer peripheral surface of the crank shaft 80, a step is formed between the stepped portion 85 and the crank arm engaging portion 83 located adjacent to the stepped portion 85 because the diameter of the stepped portion 85 is set to be greater than that of the crank arm engaging portion 83. A washer 85b abuts against that step.

The washer 85b abuts against the periphery of the small-diameter shaft through hole 32g in the inner surface of the outer casing member 32, thus providing a predetermined sliding distance to the female spline 59b of the one-way clutch 59 which is engaged with the male spline 85a of the stepped portion 85.

Figure 5A:
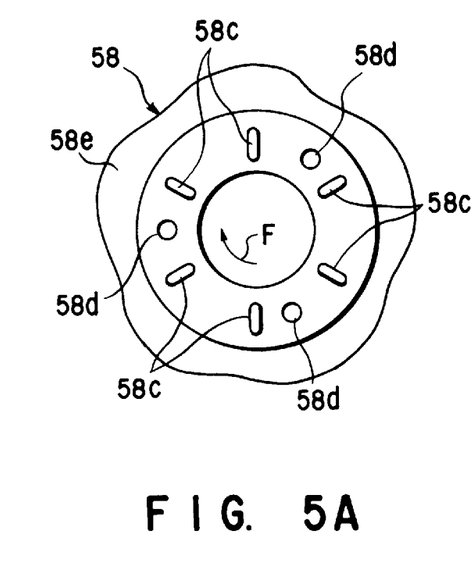
FIG. 5A is a side view showing radially arranged six engaging projections formed on a side surface of a selective engaging member facing an input gear of FIG. 4, and three bolt insertion holes framed in the side surface between these radially arranged six engaging projections.

A cylindrical center portion 58a of a selective engaging member 58 is fixed to an outer peripheral surface of the one-way clutch 59. The selective engaging member 58 has a disk-like portion 58b extending from the center portion 58a in parallel to and concentric to the input gear 56. In a side surface of the disk-like portion 58b of the selective engaging member 58 facing the input gear 56, six engaging projections 58c are formed at six positions spaced apart from each other at equal intervals in a circumferential direction of the disk-like portion 58b, as shown in FIGS. 2 and 5A, such that they extend in a radial direction of the disk-like portion 58b. In the side surface of the disk-like portion 58b of the selective engaging number 58, bolt insertion holes 58d are formed at three positions located between the six engaging projections 58c and spaced apart from each other at equal intervals in the circumferential direction of the disk-like portion 58b.

Figure 5B:
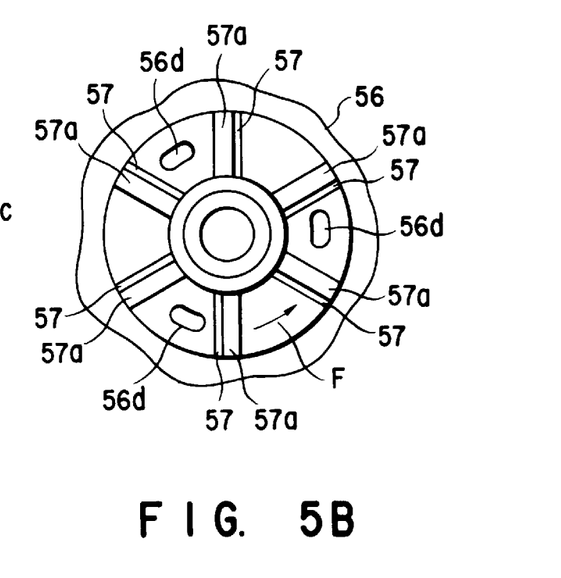
FIG. 5B is a side view showing radially arranged six engaging recesses formed in a side surface of the input gear facing the selective engaging member of FIG. 4, and circular-arc-shaped three coupling holes formed in the side surface between these radially arranged six engaging recesses.

At an area of the side surface of the input gear 56 facing the disk-like portion 58b of the selective engaging member 58, as shown in FIG. 2 and 5B, six engaged recesses 57 are formed at six positions spaced apart from each other at equal intervals in a circumferential direction of the input gear 56 so as to correspond to the radially arranged six engaging projections 58c of the disk-like portion 58b. The radially arranged six engaged recesses 57 extend in a radial direction of the input gear 56. Further, in the above described area of the side surface of the input gear 56, three coupling holes 56d are formed at three positions located between the six engaged recesses 57 and spaced apart from each other at equal intervals in the circumferential direction of the input gear 56 so as to correspond to the three bolt insertion holes 58d of the disk-like portion 58b. Each of the three coupling holes 56d is elongated in the circumferential direction to have a circular arc shape.

A bolt 61 equipped with a sleeve 60 is inserted into each of the three coupling holes 56d of the input gears 56 and each of the three elongated bolt insertion holes 58d of the disk-like portion 58b of the selective engaging member 58 from an outer side of the input gear 56 opposite to the disk-like portion 58b of the selective engaging member 58. The projecting end portion of the bolt 61 is projected from the sleeve 60 at a position spaced apart for a predetermined distance from a side surface of the disk-like portion 58b opposite to the input gear 56. An urging means such as a compression coil spring 62 is fitted on a portion of the outer peripheral surface of the sleeve 60 projecting from the side surface of the disk-like portion 58b. A nut 64 threaded on the projecting end portion of the bolt 61 compress the compression coil spring 62 with a washer 63. An urging force generated from the compression coil spring 62 urges the radially arranged six engaging projections 58c on the disk-like portion 58b of the selective engaging member 58 toward the radially arranged six engaging recesses 57 of the input gear 56.

Figure 6A:
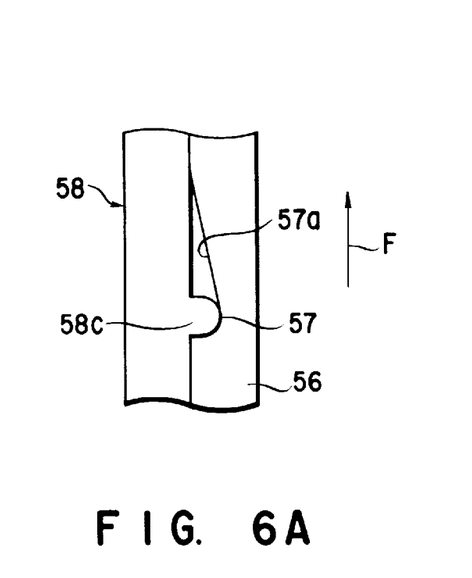
FIG. 6A is an enlarged plan view showing one engaging projection on the selective engaging member of FIG. 5A and one engaging recess of the input gear of FIG. 5B in a state that the engaging projection engages with the engaging recess in its deepest position on an inclined bottom surface of the recess, before a rotation force over a predetermined value is loaded to the selective engaging member.

In this embodiment, as shown in FIG. 6A, the cross-section of each of the radially arranged six engaging recesses 57 has an inclined surface 57a gradually shallowed in a rotational direction of the rear wheel drive gear 17 or the input gear 56 (a counter-clockwise direction as indicated by an arrow F in FIGS. 2 and 5B) when the rear wheel drive gear 17 drives the rear wheel 12 (see FIG. 1). For this reason, the radially arranged six engaging projections 58c on the disk-like portion 58b of the selective engaging member 58 urged toward the radially arranged six engaging recesses 57 of the input gear 56 by the urging force of the compression coil spring 62 are seated at deepest positions of the radially arranged sixth engaging recesses 57 until a rotation force loaded to the disk-like portion 58b of the selective engaging member 58 in a counter-clockwise direction as indicated by an arrow F in FIGS. 2 and 5B becomes larger than a predetermined value.

Figure 6B:
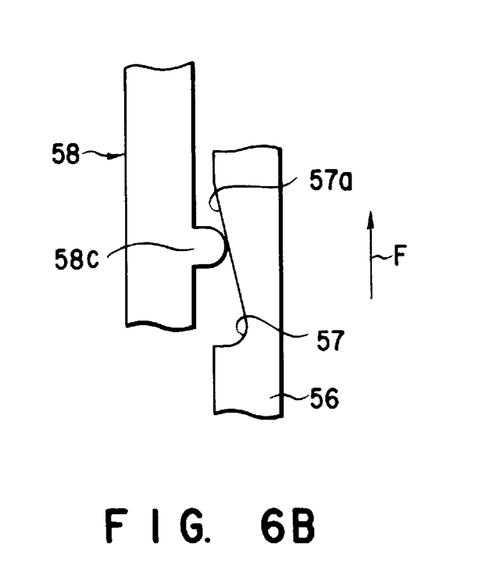
FIG. 6B is an enlarged plan view showing one engaging projection on the selective engaging member of FIG. 5A and one engaging recess on the input gear of FIG. 5B in a state that the engaging projection is moved on the inclined bottom surface of the engaging recess from the deepest position shown in FIG. 6A to a shallower position on the inclined bottom surface after a rotation force over a predetermined value has been loaded to the selective engaging member.

When a rotation force larger than the predetermined value is loaded to the disk-like portion 58b of the selective engaging member 58 in the counter-clockwise direction as indicated by the arrow F in FIGS. 2 and 5B, the radially arranged six engaging projections 58c on the disk-like portion 58b of the selective engaging member 58 are slidably moved on the inclined surfaces 57a, against frictional forces generated between the six engaging projections 58c and the inclined surfaces 57a of the radially arranged six engaging recesses 57 of the input gear 56, toward the shallow positions on the inclined surfaces 57a of the engaging recesses 57 as shown in FIG. 6B. The slide movement distance of the six engaging projections 58c is restricted by that the moving distances of the three bolts 61 of the disk-like portion 58b of the selective engaging member 58 is restricted by the circular arc shaped three coupling holes 56d of the input gear 56.

This slide movement causes a sliding movement of the female spline 59b of the one way clutch 59 integrated with the selective engaging member 58, against the urging force of the compression coil spring 62, on the male spline 85a of the stepped portion 85 of the casing-side end portion of the crank shaft 80 which engages with the female spline 59b of the one-way clutch 59. By the above-mentioned sliding movement of the one-way clutch 59, together with the selective engaging member 58, the selective engaging member 58 is move away from the input gear 56 as indicated by two-dots chain lines in FIGS. 3 and 4.

As apparent from this arrangement, according to this embodiment, an urging/restrictive rotation allowing mechanism which is interposed between the input gear 56 and the selective engaging member 58, urges the selective engaging member 58 by a predetermined force toward the input gear 56, and engages one set (engaging recesses 57a in this embodiment) of the projections or the grooves on the side surface of the input gear 56-with the other set (engaging projections 58 in this embodiment) of the projections or the grooves on the selective engaging member 58 and allows a rotation of the selective engaging member 58 in a predetermined range relative to the input gear 56, is structured by a combination of the bolts 61 equipped with the sleeves 60 and fixed to the selective engaging member 58 and the circular arc shaped coupling holes 56d of the input gear 56 into which the bolts 61a are inserted, and the compression coil springs 62 attached to the sleeve equipped bolts 61.

On the inner side surface of the outer casing member 32 in the casing 30, a power supply switch S for the motor 40 is located to face an outer peripheral portion 58e of the disk-like portion 58b of the selective engaging member 58. In this embodiment, the power supply switch S is a proximity switch 25 fixed on the inner side surface of the outer case member 32 by a known fastening means, such as a combination of a fixed bolt 26a and nut 26b. The proximity switch 25 is turned on when the outer peripheral portion 58e of the disklike portion 58b of the selective engaging member 58 moves nearer to the proximity switch 25 as indicated by a two-dots chain line in FIGS. 3 and 4, and allows a supply of electric current from the power supply 15 (see FIG. 1) to the motor 40.

With reference to FIGS. 1 to 6, explanation will be given below about an operation of the power-assisting device-equipped bicycle A of the embodiment of this invention structured by combining the power-assisting device C for a bicycle according to the embodiment of this invention with the conventional bicycle B.

When a rider on the bicycle B applies power to the pedals 81a and 81b to move the power-assisting device-equipped bicycle A, the human power loaded on the pedals 81a, 81b is transmitted through the crank arms 81, 82 and crank shaft 80 to the rotation force control unit T in the casing 30. In the rotation force control unit T, the human power is transmitted through the one-way clutch 59 from the crank shaft 80 to the selective engaging member 58. When the rotation force generated by the human power is below a predetermined value, a frictional force generated by the urging force of the compression coil springs 62 urging the selective engaging member 58 toward the input gear 56, between the radially arranged six engaging projections 58c on the side surface of the selective engaging member 58 facing the input gear 56 in the casing 30 and the radially arranged sixth engaging recesses 57 in the side surface of the input gear 56 facing the selective engaging member 58, exceeds the rotation force. Therefor, each of the radially arranged six engaging projections 58c does not move from the deepest position of each of the radially arranged sixth engaging recesses 57 in the side surface of the input gear 56 as shown in FIG. 6A, so that the selective engaging member 58 rotate the input gear 56 in the same direction (a direction as indicated by an arrow F in FIG. 2) to transmit the above-mentioned rotation force to the input gear 56. The input gear 56 transmits the above-mentioned rotation force through the hollow shaft 70 to the rear wheel drive gear 17. The rear wheel drive gear 17 transmits the rotation force to the rear wheel 12 through the chain 19 and free wheel gear 18. By this rotation force, the rear wheel 12 is rotated to move the power-assisting device-equipped bicycle A forward.

The above-mentioned rotation force transmitted from the selective engaging member 58 to the input gear 56 is also transmitted to the power transmission final-output gear 55 in the rotation force transmission mechanism 50 to rotate the power transmission final-output gear 55. Thanks to the one-way clutch 37c interposed between the power transmission final-output gear 55 and the rotation center shaft 37 for the power transmission final-output gear 55, the power transmission final-output gear 55 is freely rotated on the rotation center shaft 37 and the rotation center shaft 37 is not rotated. For this reason, most of the above-mentioned rotation force transmitted from the selective engaging member 58 to the input gear 56 is used for the rotation drive of the rear wheel 12.

When, for example, the power-assisting device equipped bicycle A goes uphill or the movement speed of the power-assisting device-equipped bicycle A reaches predetermined value, the rotation force generated by the rider reaches a predetermined value. At this time, the rotation force being over the predetermined value and transmitted by the one way clutch 37a to the selective engaging member 58, overcomes the frictional force generating between the radially arranged six engaging projections 58c on the side surface of the selective engaging member 58 and the radially arranged six engaging recesses 57 in the side surface of the input gear 56 by the urging force of the compression coil springs 62 urging the selective engaging member 58 against the input gear 56, so that the selective engaging member 58 is rotated faster than the input gear 56.

By the rotational of the selective engaging member 58 relative to the input gear 56, each of the radially arranged six engaging projections 58c on the side surface of the selective engaging member 58 moves in each of the radially arranged six engaging recesses 57 of the input gear 56 from the deepest position toward the shallower position as shown in FIG. 6B. This rotational displacement of the selective engaging member 58 is restricted to the length of each of the circular arc shaped coupling holes 56d because the movement distance of each the sleeve-equipped bolts 61 fixed to the selective engaging member 58 is restricted by each of the circular arc shaped coupling holes 56*d* into which the sleeve-equipped bolts 61 are inserted. Even after, therefore, the rotational displacement is produced, the rotation force transmitted from the rider to the selective engaging member 58, continues to be transmitted, through the engagement of each of the sleeve-equipped bolts 61 which are fixed to the selective engaging member 58 with a circumferential end of each of the circular arc shaped coupling holes 56*d* of the input gear 56 into which the sleeve-equipped bolts 61 are inserted.

Since the one-way clutch 59 on which the selective engaging member 58 is attached is movable on the crank shaft 80 along a rotation center line of the crank shaft 80 in a direction away from the input gear 56, the movement of the radially arranged six engaging projections 58*c* on the side surface of the selective engaging member 58 in the radially arranged six engaging recesses 57 in the side surface of the input gear 56 causes the movement of the selective engaging member 58, together with the one-way clutch 59, in a direction in which the selective engaging member 58 is moved away from the input gear 56 along the rotation center line of the crank shaft 80 against the urging force of the compression coil springs 62, as shown in FIG. 6B.

When the selective engaging member 58 is moved from a frictional engaging position as indicated by a solid line in FIG. 3 to a slip generated position as indicated by a two-dots chain line in FIG. 3 in a direction in which the selective engaging member 58 is moved way from the input gear 56, the above-mentioned movement of the outer peripheral portion of the selective engaging member 58 is sensed by the power supply switch S structured by the proximity switch 25 in the casing 30. This causes the power supply switch S to be turned ON and, as a result, electric current is supplied from the power supply 15 to the electric motor 40 to start the rotation of the output shaft 41 of the electric motor 40. The rotation force of the output shaft 41 of the electric motor 40 is transmitted by the rotation force transmission mechanism 50 in the casing 30 to the rotation center shaft 37 for the power transmission final-output gear 55 in the rotation force transmission mechanism 50 which engages with the input gear 56. Further, the rotational force of the output shaft 41 of the motor 40 is transmitted to the power transmission final-output gear 55 by the one-way clutch 37*c* between the power transmission final-output gear 55 and the rotation center shaft 37, and finally from the power transmission final-output gear 55 to the input gear 56.

Here, not only a human power of the predetermined value transmitted from the selective engaging member 58 to the input gear 56 but also the rotation force transmitted from the motor 40 through the rotation force transmission mechanism 50 to the input gear 56 are loaded to the input gear 56. A total of the human power of the predetermined given value and rotation force from the motor 40, both of which being loaded to the input gear 56, is transmitted through the hollow shaft 70 to the rear wheel drive gear 17, and the rear wheel drive gear 17 rotates the rear wheel 12 by the total force to move the power-assisting device-equipped bicycle A forward.

The rotation force from the motor 40 added for the drive of the rear wheel 12 when the rotation force generated by the human power reaches the predetermined value, continues to be applied after the rotational force generated by the human power exceeds the predetermined value. Consequently, the magnitude of the rotation force generated by the human power which is required after the rotation force required for the drive of the rear wheel 12 exceeds the predetermined value, is a value obtained by subtracting the rotation force of the motor 40 from the rotation force required for the drive of the rear wheel 12.

For this reason, for example, when the power-assisting device equipped bicycle A goes uphill or even after the movement speed of the power-assisting device equipped bicycle A reaches a predetermined value, a rider on the power-assisting device equipped bicycle A needs only much less human power than a rider on an ordinary conventional bicycle.

FIG. 7 shows the power-assisting device C according to the embodiment of this invention in a state that it is separated from the ordinary conventional bicycle B (see FIG. 1) to which the power-assisting device C is to be attached, and it is put on a market.

As apparent from FIG. 7, the power-assisting device C for a bicycle is put on a market as one block in which the motor cover 44, crank arm engaging portion 83 on the casing-side end portion of the crank shaft 80, portion of the hollow shaft 70 on the side opposite to the casing, and crank arm engaging portion 84 of the crank shaft 80 on the side opposite to the casing are projecting into an outer space.

Figure 8:
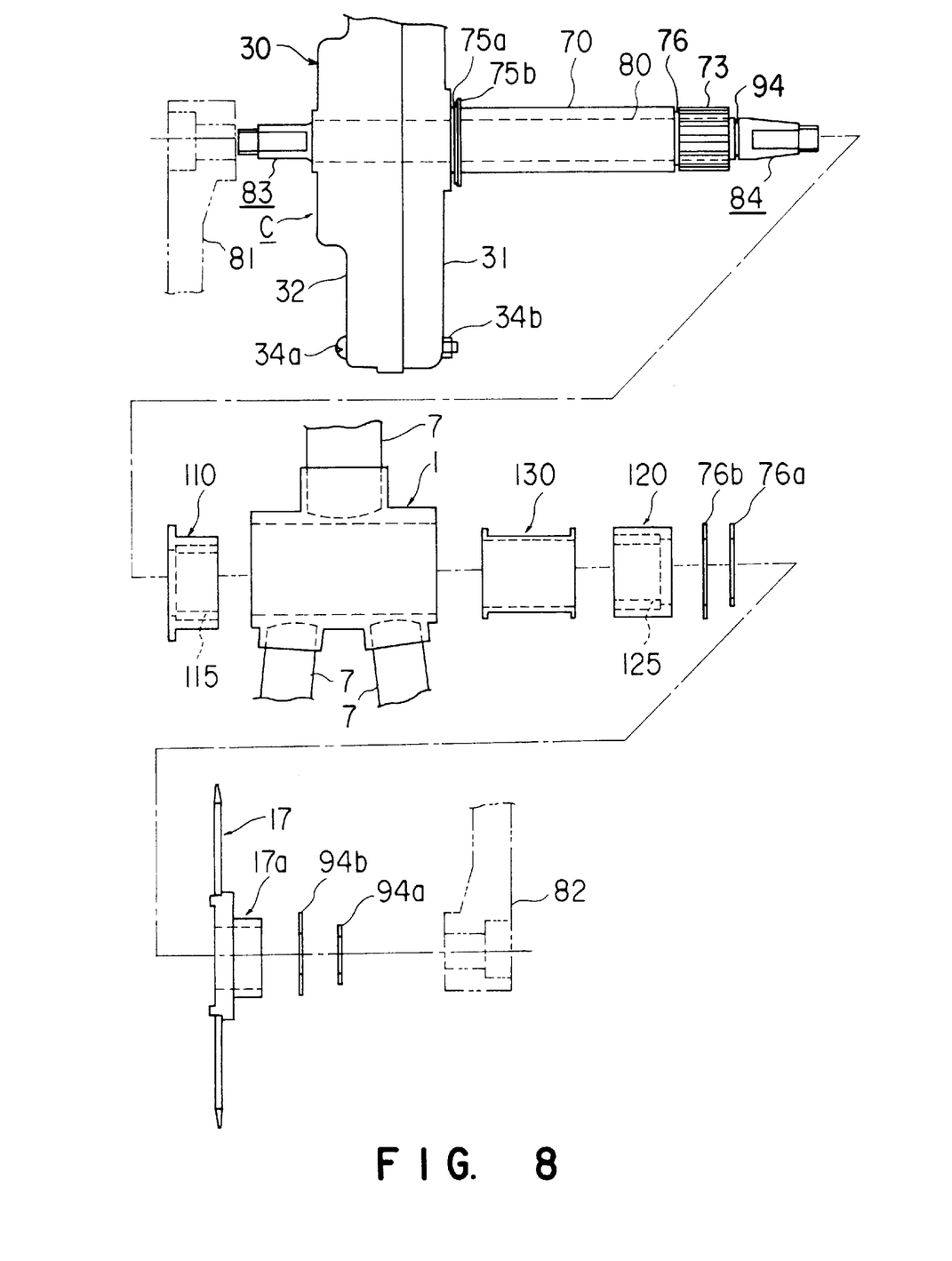
FIG. 8 is an exploded view showing a process for mounting the power-assisting device according to the embodiment of this invention and separated from the conventional bicycle as in FIG. 7, to the conventional bicycle.

FIG. 8 diagrammatically shows a process for mounting the power-assisting device C for a bicycle in an accordance with the one embodiment of this invention, on the ordinary conventional bicycle B (see FIG. 1). At first, the annular engaging member 75*a* is fitted in the annular groove 75 (see FIG. 4) adjacent to the casing 30 on the outer peripheral surface of the hollow shaft 70 from the side opposite to the casing 30, and then the washer 75*b*, one bearing holding member 110 holding the bearing 115, and bearing position restricting member 130 are fitted in this order on the outer peripheral surface of the hollow shaft 70 from the side opposite to the casing 30. Next, the casing-opposite end portion of the hollow shaft 70, together with the end of the crank shaft 80 on the opposite end of the casing 30, is inserted from a side of the casing 30 into the center hole 1*a* of the hanger lug 1 of the bicycle B (see FIG. 1) and the bearing holding member 110 is threaded into the casing-side end of the inner peripheral surface of the center hole 1*a*. The other bearing holding member 120 holding the bearing 125 is fitted on the end portion of the hollow shaft 70 extending from the center hole 1*a* of the hanger lug 1 toward the side opposite to the casing 30, and is threaded into the end portion of the inner peripheral surface of the center hole 1*a* from the side opposite to the casing 30. Further, the washer 76*b* is fitted on the end portion of the hollow shaft 70 on the side opposite to the casing 30, and then the annular engaging member 76*a* is fitted in the annular groove 76 therein. The female spline 17*b* (see FIG. 4) of the coupling member 17*a* at the central portion of the rear wheel drive gear 17 is fitted on the male spline 73 on the end portion of the hollow shaft 70 on the side opposite to the case 30, and then the washer 94*b* is fitted on the end portion of the hollow shaft 70 on the side opposite to the casing 30 at a position adjacent to the outer side of the male spline 73. Finally, the annular engaging member 94*a* engages with the annular groove 94 adjacent to the outer side of the male spline 73 at the end portion of the hollow shaft 70 on the side opposite to the casing 30.

The fitting base 45 on the motor cover 44 fixed to the casing 30 at a position located away from the hollow shaft 70 and crank shaft 80 is detachably connected by the well known fixing means such as the fitting plate 46 and screw 47, to the down tube 3 of the bicycle B as particularly shown in FIG. 2 at a proper time after the end portion of the hollow shaft 70 on the side opposite to the casing 30, together with the end portion of the crank shaft 80 on the side opposite to the casing 30, is inserted from the casing side into the center hole 1a of the hanger lug 1 of the bicycle B (see FIG. 1).

At the end, the crank shaft engaging holes 81b, 82b at the base end portions of the crank arms 81, 82 are detachably engaged, as shown in FIG. 4, with the crank arm engaging portions 83, 84 on the both end sides of the crank shaft 80. And, the nuts 140 and 141 are threaded on the fixing male screws 83b and 84b at the projecting ends of the crank arm engaging portions 83 and 84. By doing so, the process for attaching the power-assisting device C according to the embodiment of this invention to the ordinary conventional bicycle B (see FIG. 1) has been completed.

Figure 9A:
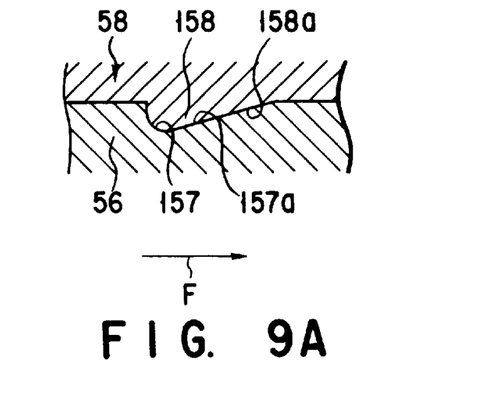
FIG. 9A is an enlarged plan view showing a modification of a rotation power control unit including the combination of the engaging projection of the selective engaging member of FIG. 5A and the engaging recess of the input gear of FIG. 5B to transmit a rotation force from the selective engaging member to the input gear in a state that the engaging projection on selective engaging member is engaged with the corresponding engaging recess in the input gear at its deepest position on an inclined bottom surface of the recess.

FIG. 9A shows a modification of the combination of one of the radially arranged six engaging projections 58c on the side surface of the selective engaging member 58 and one of the radially arranged six engaging recesses 57 in the side surface of the input gear 56 in the rotation force control unit T as shown in FIG. 6A.

In this modification, a cross section of each of radially arranged six engaging recesses 157 in the side surface of the input gear 56 is the same as that of each of the radially arranged six engaging recesses 57 in the side surface of the input gear 56 of the above described one embodiment, as shown in FIG. 6A. And, a cross-section of each of radially arranged six engaging projections 158 on the side surface of the selective engaging member 58 is different from that of each of the radially arranged six engaging projections 58c on the side surface of the selective engaging member 58 of the above described one embodiment, as shown in FIG. 6A and coincides with the cross-section of each of the radially arranged six engaging recesses 157 of the input gear 56. Each of the engaging projections 58c of the selective engaging member 58 has an inclined surface 158a matched to an inclined surface 157a of each of the engaging recesses 157 of the input gear 56.

Figure 9B:
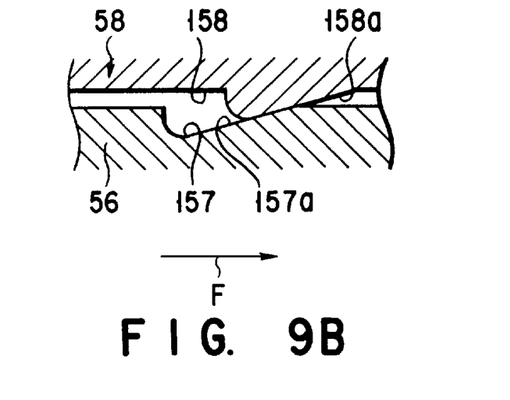
FIG. 9B is an enlarged plan view showing a state that the engaging projection of the modification in FIG. 9A is moved on the inclined bottom surface of the engaging recess of the modification in FIG. 9A from the deepest position shown in FIG. 9A to a shallower position on the inclined bottom surface after a rotation force over a predetermined value is loaded to the selective engaging member.

In this modification, as shown in FIG. 9B, since a contact area at which each of the engaging projections 58c of the selective engaging member 58 contact the inclined surface 157a of each of the engaging recesses 157 of the input gear 56 is larger than that of the one embodiment. By doing so, when a human power greater than a predetermined value is loaded to the selective engaging member 58 to cause a rotational displacement of the selective engaging member 58 relative to the input gear 56, the life of the engaging projections 58c and engaging recesses 157 and hence the life of the rotation force control unit T can be extended compared with the above described embodiment.

Figure 10A:
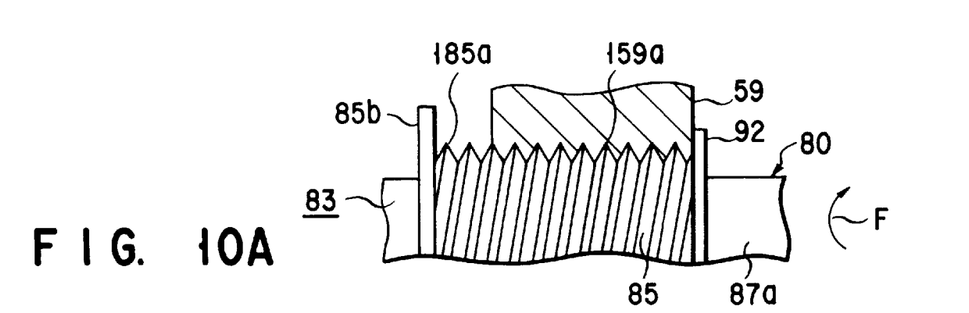
FIG. 10A is a side view schematically showing a main part of another modification of the rotation power control unit for transmitting the rotation force from the selective engaging member to the input gear before a rotation force over a predetermined value is loaded to the selective engaging member.

FIG. 10A is a side view schematically showing a main part of another structure serving as the same as the combination of the radially arranged six engaging projections 58c on the side surface of the selective engaging member 58 and radially arranged six engaging recesses 57 in the side surface of the input gear 56 in the rotation force control unit T, as shown in FIG. 6A.

In this structure, as shown in FIG. 10A, an externally threaded portion 159a is formed in place of the spline 85a on the outer peripheral surface of the stepped section 85 of the crank shaft 80 situated in the casing 30 in FIG. 4. As shown in FIG. 10A, an internally threaded portion 159a is formed in place of the spline 59b in FIG. 4 on the inner peripheral surface of the one-way clutch 59 provided on the outer peripheral surface of the stepped portion 85 of the crank shaft 80, and engages with the externally threaded portion 159a.

And, the radially arranged six engaging projections 58c are not formed on the side surface of the selective engaging member 58, and the radially arranged six engaging recesses 57 are not formed in the side surface of the input gear 56.

Figure 10B:
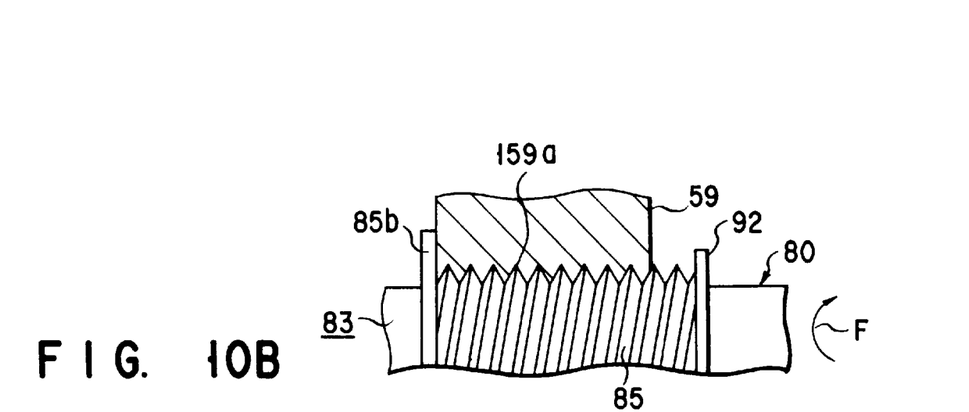
FIG. 10B is a side view schematically showing the main part of the modification of the rotation power force control unit of FIG. 10A in an operative state in which, after the rotation force over the predetermined value is loaded to the selective engaging member, the modification operates the motor to generate a rotation force in addition to the above-mentioned rotation force.

By the combination of the externally threaded portion 159a on the outer peripheral surface of the stepped portion 85 of the crank shaft 80 and internally threaded portion 159a in the inner peripheral surface of the one-way clutch 59 as described above, the crank shaft 80 rotates in advance relative to the one-way clutch 59 when a rotation force greater than a predetermined value is loaded to the crank shaft 80. The advance rotation of the crank shaft 80 relative to the one-way clutch 59 moves the one-way clutch 59, together with the selective engaging member 58, in a direction away from the input gear 56, as shown in FIG. 10B by the combination of the externally threaded portion 159a on the outer peripheral surface of the stepped portion 85 of the crank shaft 80 and internally threaded portion 159a in the inner peripheral surface of the one-way clutch 59. Such movement of the selective engaging member 58 as described above turns on the power supply switch S as the same as in the above described embodiment of this invention.

INDUSTRIAL APPLICABILITY

The power-assisting device of this invention is combined with the ordinary conventional bicycle to provide a power-assisting device equipped bicycle.

We claim:

1. A power-assisting device adapted for use with a bicycle, said power-assisting device comprising:
    a hollow shaft which is adapted to be rotatably supported in a hanger lug of the bicycle, said hollow shaft being restricted to movement along a rotation center line thereof, and said hollow shaft having (i) a first end portion adapted to be projected out of the hanger lug and detachably attached to a rear wheel drive gear, and (ii) a second end portion adapted to be projected out of the hanger lug and detachably attached to an input gear;
    a crank shaft which is rotatably supported in a center hole of the hollow shaft, said crank shaft being restricted to movement along a rotation center line thereof, and said crank shaft having (i) a first end portion extending out of the hollow shaft and adapted to be detachably attached to a first one of a pair of pedal-equipped crank arms and (ii) a second end portion extending out of the hollow shaft and adapted to be detachably attached to a second one of the pair of pedal-equipped crank arms;
    a power-assisting unit which is adapted to be detachably attached to a body of the bicycle, said power-assisting unit having a motor and a rotation force transmission mechanism adapted to transmit a motor rotation force from the motor to the input gear, and said rotation force transmission mechanism having a one-way clutch for transmitting the motor rotation force to the input gear only in a direction for driving the bicycle forward; and
    a rotation force control unit which is interposed between the crank shaft and the hollow shaft outside the hanger lug, said rotation force control unit transmitting a rotation force of the crank shaft to the hollow shaft and controlling the motor to generate the motor rotation force when a value of the rotation force of the crank shaft becomes larger than a predetermined value.

2. The power-assisting device according to claim 1, further comprising a single casing for housing the power-assisting unit, the input gear, the rotation force control unit, and the first end portion of the crank shaft.

3. The power-assisting device according to claim 2, further comprising a subcasing for holding the rotation force transmission mechanism of the power-assisting unit, and wherein the rotation force transmission mechanism comprises (i) a plurality of rotation members having rotation center shafts and (ii) shaft support structures, provided at positions in the subcasing corresponding to end portions of the rotation center shafts of the rotation members, for rotatably supporting the end portions of the rotation center shafts.

4. The power-assisting device according to claim 1, wherein the rotation force control unit comprises:

- a first set of projections and grooves formed in a radial array on a first side surface of the input gear of the hollow shaft;
- a selective engaging member having a second set of projections and grooves arranged to face the first set of projections and grooves formed on the first side surface of the input gear of the hollow shaft, said selective engaging member being connected to the crank shaft through the one-way clutch and being capable of transmitting human power from the crank shaft only in the direction for driving the bicycle forward, and said selective engaging member being movable in a predetermined range in a direction along the rotation center line of the crank shaft;
- an urging/restricting rotation mechanism provided between the input gear and the selective engaging member, said urging/restricting rotation mechanism urging the selective engaging member, with a predetermined force, toward the input gear to engage the first and second set of projections and grooves and to allow rotation of the selective engaging member relative to the input gear in a predetermined range; and
- a power supply switch for connecting the motor to a power supply by separating the selective engaging member from the input gear over a predetermined range in the direction along the rotation center line of the crank shaft.

5. The power-assisting device according to claim 1, further comprising bearing holding members threadably engaged in first and second end openings of a center hole of the hanger lug of the bicycle, each of said bearing holding members having a center hole into which the hollow shaft is inserted and holding a bearing around the center hole for rotatably supporting the hollow shaft in a manner such that the hollow shaft is restricted to movement along the rotation center line thereof.

6. A bicycle equipped with a power-assisting device, comprising:

- a body including a seat and a hanger lug having a center hole through which a crank shaft is rotatably inserted;
- a rear wheel rotatably supported on the body at a position located behind the seat;
- a handle provided on the body at a position located in front of the seat;
- a front wheel rotatably supported on the handle;
- a hollow shaft which is rotatably supported in the hanger lug and which is restricted to movement along a rotation center line thereof, said hollow shaft having (i) a first end portion projecting out of the hanger lug and detachably attached to a rear wheel drive gear, and (ii) a second end portion projecting out of the hanger lug and detachably attached to an input gear;
- a crank shaft which is rotatably supported in a center hole of the hollow shaft, said crank shaft being restricted to movement along a rotation center line thereof, and said crank shaft having (i) a first end portion extending out of the hollow shaft and adapted to be detachably attached to a first one of a pair of pedal-equipped crank arms and (ii) a second end portion extending out of the hollow shaft and adapted to be detachably attached to a second one of the pair of pedal-equipped crank arms;
- a power-assisting unit which is detachably attached to the body of the bicycle, said power-assisting unit having a motor and a rotation force transmission mechanism adapted to transmit a motor rotation force from the motor to the input gear, and said rotation force transmission mechanism having a one-way clutch for transmitting the motor rotation force to the input gear only in a direction for driving the bicycle forward;
- a rotation force control unit which is interposed between the crank shaft and the hollow shaft outside the hanger lug, said rotation force control unit transmitting a rotation force of the crank shaft to the hollow shaft and controlling the motor to generate the motor rotation force when a value of the rotation force of the crank shaft becomes larger than a predetermined value; and
- a rear wheel drive rotation force transmission mechanism for transmitting the rotation force from the rear wheel drive gear of the hollow shaft to the rear wheel of the bicycle.

7. A bicycle according to claim 6, further comprising bearing holding members threadably engaged in first and second end openings of a center hole of the hanger lug of the bicycle, each of said bearing holding members having a center hole into which the hollow shaft is inserted and holding a bearing around the center hole for rotatably supporting the hollow shaft in a manner such that the hollow shaft is restricted to movement along the rotation center line thereof.

* * * * *